H. J. FERRIS.
BULL STAFF.
APPLICATION FILED MAR. 17, 1917.
1,226,201.
Patented May 15, 1917.
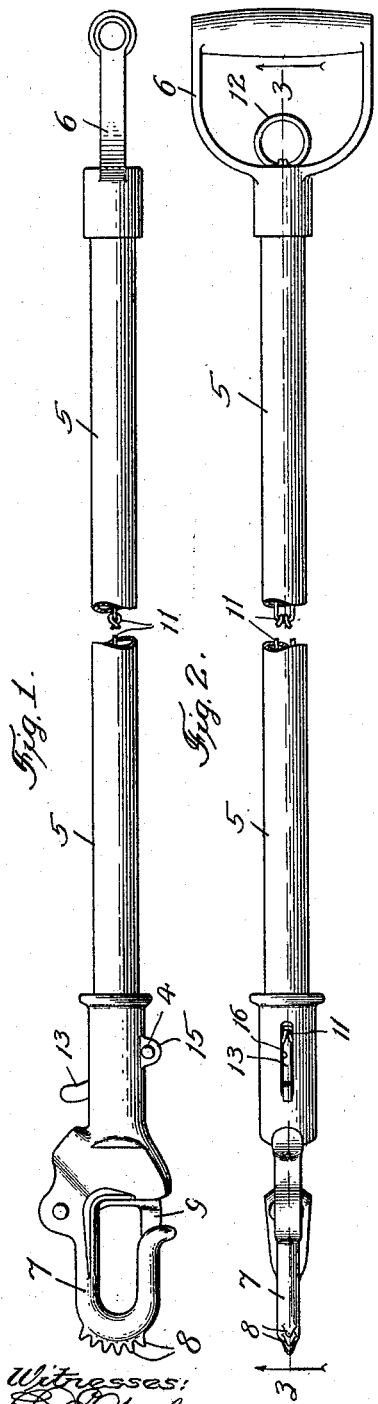
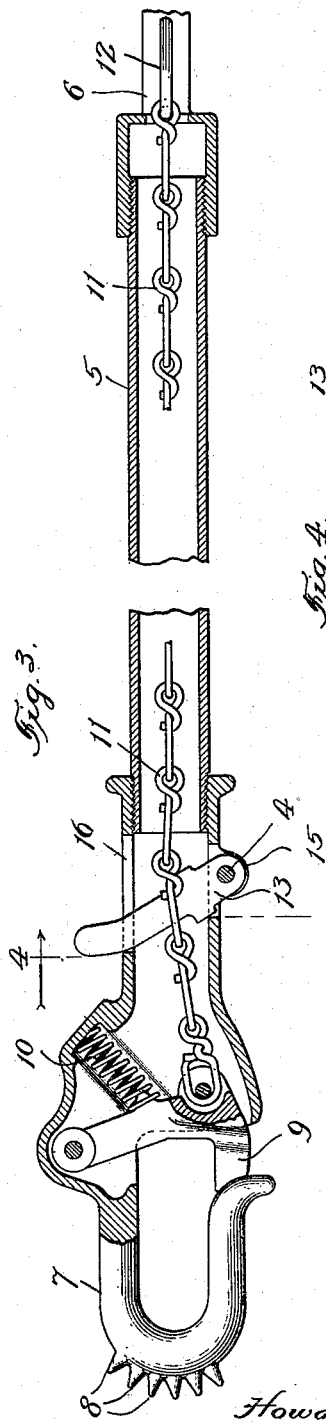
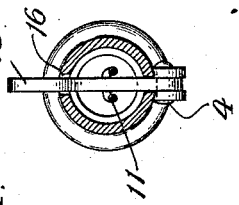
Inventor:
Howard J. Ferris,

UNITED STATES PATENT OFFICE.

HOWARD J. FERRIS, OF HARVARD, ILLINOIS, ASSIGNOR TO HUNT-HELM-FERRIS & CO., OF HARVARD, ILLINOIS, A CORPORATION OF ILLINOIS.

BULL-STAFF.

1,226,201. Specification of Letters Patent. Patented May 15, 1917.

Application filed March 17, 1917. Serial No. 155,455.

*To all whom it may concern:*

Be it known that I, HOWARD J. FERRIS, a citizen of the United States, residing at Harvard, in the county of McHenry and State of Illinois, have invented a new and useful Improvement in Bull-Staves, of which the following is a specification.

My invention relates to certain new and useful improvements in bull-staves and is fully described and explained in the specification and shown in the accompanying drawings, in which—

Figure 1 is an elevation of my improved bull-staff; Fig. 2 is an elevation at right-angles to Fig. 1; Fig. 3 is a section on the line 3 of Fig. 2; and Fig. 4 is a transverse section on the line 4 of Fig. 2.

Referring to the drawings, 5 is a tube upon the rear end of which is mounted a handle 6 and upon the front end of which is mounted a hook 7 provided with spurs 8 for the usual purpose. The rear of the hook is in the form of a hollow casting to fit over the tube 5, and a pawl 9 is pivoted within the bull-staff and has its end pressed in a direction to close the hook when in normal position, by a spring 10. 11 is an operating chain running from the hook back through the tube to an operating ring 12, which may be pulled backward by the finger of the operator to withdraw the pawl and open the hook.

13 is an operating lever running in a slot in the hollow rear end of the hook and mounted upon a pin 14, secured in ears 15 formed integral with the hook. The opposite end of this lever 13 extends through a slot 16 and between its ends the lever passes through one of the links of the chain 11.

My device is used in the following way: For engaging the bull-staff with a ring in the bull's nose it is usually necessary to take hold of the staff close to its forward end and for this purpose the lever 13 is manipulated by the operator to open the hook. When engagement is effected the staff is employed in the ordinary manner and held by its rear end, and it can be released by pulling the ring 12 backward.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

What I claim as new and desire to secure by Letters Patent is:

1. The herein described bull-staff, having in combination a hollow tubular portion, a handle at the rear thereof, a hook at the front thereof, a hook-closing pawl, a member running through the hollow tubular member to the handle and connected with the pawl for opening the same, and a pawl-operating lever engaging the member adjacent to the hook.

2. The herein described bull-staff, comprising a tubular member, a handle at one end, a hook at the other end, a hook-closing pawl, a chain running through the tubular member from the pawl to the handle for opening the hook, and an operating lever extended through a chain-link and projecting laterally from the staff adjacent to the hook for operating the pawl when grasped near its front end.

In testimony whereof I have hereunto set my hand this 13th day of March, 1917.

HOWARD J. FERRIS.

Copies of this patent may be obtained for five cents each, by addressing the "Commissioner of Patents Washington, D. C."